US009214055B2

(12) United States Patent
Lawrence et al.

(10) Patent No.: US 9,214,055 B2
(45) Date of Patent: *Dec. 15, 2015

(54) VIDEO EXTENSION LIBRARY SYSTEM AND METHOD

(71) Applicant: Bally Gaming, Inc., Las Vegas, NV (US)

(72) Inventors: James Lawrence, Henderson, NV (US); Pravinkumar Patel, Las Vegas, NV (US); Lasse Faabeng, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/052,002

(22) Filed: Oct. 11, 2013

(65) Prior Publication Data

US 2014/0106880 A1 Apr. 17, 2014

Related U.S. Application Data

(63) Continuation of application No. 12/618,662, filed on Nov. 13, 2009, now Pat. No. 8,568,227.

(51) Int. Cl.
*A63F 9/24* (2006.01)
*A63F 13/00* (2014.01)
*G07F 17/32* (2006.01)

(52) U.S. Cl.
CPC ............ *G07F 17/3211* (2013.01); *G07F 17/32* (2013.01); *G07F 17/3223* (2013.01)

(58) Field of Classification Search
CPC ........................................................ G07F 17/32
USPC .................................... 463/20, 30, 31, 42, 43
See application file for complete search history.

(56) References Cited

U.S. PATENT DOCUMENTS

| | | | |
|---|---|---|---|
| 5,745,761 | A | 4/1998 | Celi, Jr. et al. |
| 5,898,892 | A | 4/1999 | Gulick et al. |
| 6,052,685 | A | 4/2000 | Eastwick et al. |
| 6,775,835 | B1 | 8/2004 | Ahmad et al. |
| 6,884,171 | B2 | 4/2005 | Eck et al. |
| 6,977,656 | B1 | 12/2005 | Lee |
| 7,181,731 | B2 | 2/2007 | Pace et al. |
| 7,477,252 | B2 | 1/2009 | Chun |
| 7,536,683 | B2 | 5/2009 | Zimmerman et al. |
| 7,618,617 | B2 | 11/2009 | Dubief et al. |

(Continued)

*Primary Examiner* — Jay Liddle
*Assistant Examiner* — Ryan Hsu
(74) *Attorney, Agent, or Firm* — Brooke W. Quist; Marvin A. Hein; Philip J. Anderson

(57) ABSTRACT

Various embodiments disclosed herein are directed to a game platform and video extension system for a gaming device. The system includes an operating system that provides services to render graphics for the gaming device. Further, the operating system includes an OS video engine and a server. The system also includes a game that includes a game library and game application. The game library includes one or more library video engines. The game application includes one or more game modules, in which each game module is associated with a corresponding library video engine in the game library or OS video engine in the operating system. Additionally, the system enables game modules within the gaming application that have new features which are not supported by the video engine of the game operating system to be instead supported by corresponding library video engines within the game library.

27 Claims, 7 Drawing Sheets

(56) References Cited

U.S. PATENT DOCUMENTS

| | | | | |
|---|---|---|---|---|
| 7,931,533 | B2 | 4/2011 | LeMay et al. | |
| 8,250,558 | B2 | 8/2012 | Dadiomov | |
| 2002/0154214 | A1 | 10/2002 | Scallie et al. | |
| 2003/0037173 | A1 | 2/2003 | Pace et al. | |
| 2003/0051236 | A1 | 3/2003 | Pace et al. | |
| 2003/0069074 | A1 * | 4/2003 | Jackson | 463/43 |
| 2005/0039197 | A1 * | 2/2005 | Ahmad et al. | 719/331 |
| 2008/0188311 | A1 | 8/2008 | Topham et al. | |

* cited by examiner

VIDEO EXTENSION LIBRARY SYSTEM AND METHOD

CROSS-REFERENCE TO RELATED APPLICATION

This application is a continuation of U.S. patent application Ser. No. 12/618,662, filed Nov. 13, 2009 which is herein incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

This disclosure relates generally to a gaming system and, more particularly, to a system and methodology for providing a video support that extends the video server functionality.

BACKGROUND

In game development for casino-type gaming devices, new features (such as video features) are often being added. However, since a video engine is typically an operating system feature, there is usually a waiting period until an operating system is approved. In this regard, it has traditionally been the operating system that contains a video engine.

Currently, the operating system for gaming machines supports the SAVAGE onboard video chipset and an NVIDIA card attached to the available PCI slot. For hardware acceleration, X-Windows and NVIDIA drivers on the target are employed. The current gaming platform provides graphics services to applications only through the OS video library. The video library clients talk to a separate video server application that renders graphics content to the display. Traditionally, graphics processing is done on the server side through the same graphics context and is driven by client messages delivered via IPC (Interprocess communication). The services that are supported include some basic 2D image formats, 2D movie formats, and transparency. Further, these services take advantage of OpenGL hardware acceleration.

Within the operating system is a video engine, with a game application making calls to the video engine. If upgrades and enhancements are made into the video engine, for example to add 3D technology, multiple windows support, and the like, the operating system needs to be modified before the game application can benefit from any of the new enhancements. Without the support of the operating system, the game application has no access to the enhancements.

Accordingly, it would be desirable to use more advanced video technologies with video support that extends the video server functionality.

SUMMARY

Briefly, and in general terms, various embodiments are directed to a game platform and video extension system for a gaming machine, in which game videos interact with the game platform and video extension system. The system includes an operating system and one or more games. The operating system provides services to render graphics for the gaming machine. Additionally, the operating system includes a OS video engine and a server. Each game includes a game library and game application, wherein the game library includes one or more library video engines. The game application includes one or more game modules, and each game module is associated with a corresponding library video engine in the game library or OS video engine in the operating system. The system enables game modules within the gaming application that have new features which are not supported by the video engine of the operating system to be instead supported by corresponding library video engines within the game library. A game module having the new features accesses the server and not the OS video engine, and a game module without the new features accesses the OS video engine.

In some embodiments, the gaming machine is a hand-held, portable device. Continuing, in some embodiments, the hand-held, portable device is a cellular-based device, mobile phone, personal digital assistant, tablet-type computing device, or other personal computing device. In another aspect of one embodiment, the gaming machine includes a GPS device, thereby ensuring a location of play. In still another aspect of one embodiment, the gaming machine includes a biometric device, thereby ensuring an identity of the player.

Other features and advantages will become apparent from the following detailed description, taken in conjunction with the accompanying drawings, which illustrate by way of example, the features of the various embodiments.

DETAILED DESCRIPTION

Figure 1:
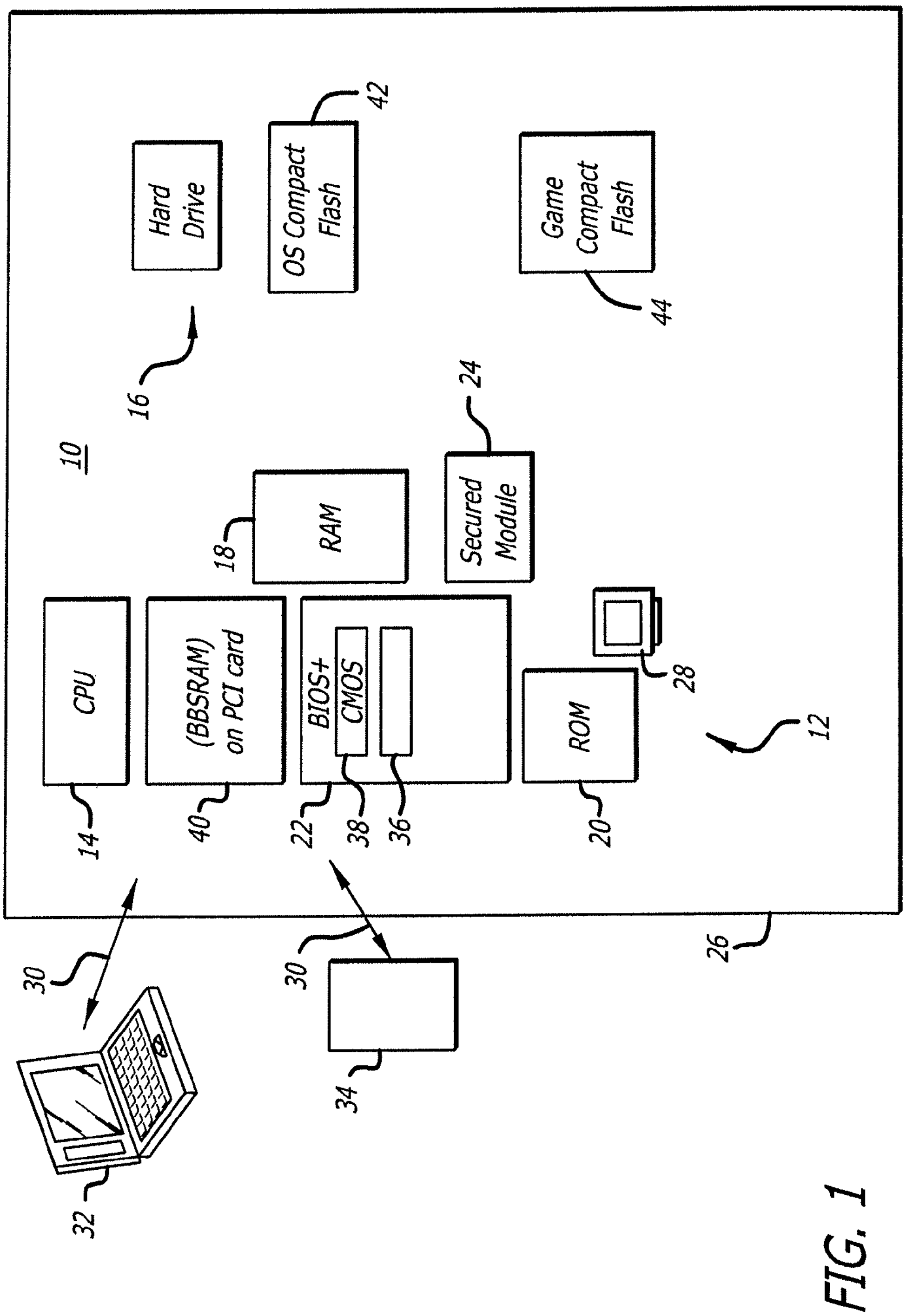
FIG. 1 illustrates a block diagram of the components of a gaming device.

Various embodiments disclosed herein are directed to gaming devices having a system and method for providing a video extension library that extends video server functionality. In one such embodiment, a video extension system enables the loading of an additional shared library from either the game flash, operating system flash, or a common package. By bundling the video game technology with the game application, no operating system update is required. Preferably, the video server checks to see which library is newer and loads the newest one. The video extension system enables new features to be implemented without needing operating system enhancements. At the same time, defects may be fixed in those same features with operating system updates later.

Video service architecture of the game platform for an electronic gaming machine is described herein. Video services are primarily used by game applications and features, but also by operating system displays such as setup menus, tilts, and door statuses. Video for the game platform of a gaming machine requires interaction of the four layers of the game platform, which includes the gaming hardware, the Linux kernel, the gaming operating system, and the game application. The gaming hardware includes a video chipset that is provided for the EGM. The Linux kernel includes a driver that manages the low-level details of the device. The game operating system provides base services to render graphics. Lastly, the game application (i.e., GameApp) utilizes the operating system API (application program interface) to display content.

In one embodiment of the video extension system, the graphics code of the game application may be implemented as a very thin layer that is driven by the data provided by non-programmers and artists. Preferably, the game core is configured with a separation between game logic and presentation logic. In one embodiment, the video libraries and tools provide a configuration that functions effectively in isolation from other components in the gaming platform.

The video libraries essentially abandon a client/server architecture in favor of a shared library configuration that is common to both the game and the operating system, which enables easier extensions to functionality. The shared library configuration facilitates easy addition of features for video, which are driven by short-term deadlines from game development requirements. In one specific, non-limiting embodiment, games have support for rendering 3D polygon-based models. The existing methodology that all content utilizes flat 2D movies is likely to lead to poor performance. Memory and CPU utilization improves with polygon-based rendering and is a more scalable architecture.

By implementing an embodiment of the video extension system, content is easier to create, leading to higher productivity from artists and game developers. Additionally, the polygon models used in some embodiments have lower memory usage requirements. Furthermore, by better utilizing hardware support and using less intensive models, there is lower CPU usage. Moreover, the video extension system supports powerful run-time effects such as shading, rotating, physics, and lighting, which are not available otherwise. In this manner, the video extension system provides a richer set of tools for programmers and artists. Referring now to the drawings, wherein like reference numerals denote like or corresponding parts throughout the drawings and, more particularly to FIGS. 1-3, there are shown various embodiments of a gaming system employing an Iris video codec engine system.

FIG. 1 illustrates a block diagram of the components 12 of a gaming device 10. The components 12 comprise, for example, and not by way of limitation, software or data file components, firmware components, hardware components, or structural components of the gaming machine 10. These components include, without limitation, one or more processors 14, a hard disk device 16, volatile storage media such as random access memories (RAMs) 18, read-only memories (ROMs) 20, or electrically-erasable and programmable ROMs (EEPROMS), such as basic input/output systems (BIOS) 22. Additionally, the gaming device 10 includes a secured module 24. The secured module is a hardware component that is one-time programmable. One or more security algorithms may be provided on the secured module. The security algorithm generates a challenge (e.g., generates a random number), calculates an expected response to the challenge, and determines the validity of the BIOS, based on the response to the challenge provided by the BIOS. In one embodiment, the secured module is a field-programmable gate array (FPGA). In another embodiment, the secured module is a trusted platform module (TPM).

In one embodiment, components 12 also include data files (which are any collection of data, including executable programs in binary or script form, and the information those programs operate upon), gaming machine cabinets (housings) 26, displays 28, or compact disk read-only memory (CDROM) or CD read-write (CR-RW) storage. In one embodiment, the data files may include data storage files, software program files, operating system files, and file allocation tables or structures. Ports 30 are to be included with the gaming machine 10 for connection to diagnostic systems 32 and other input/output devices 34. In one embodiment, the ports 30 each comprise a serial port, universal serial bus (USB) port, parallel port or any other type of known port, including a wireless port. Preferably, each of the components 12 have embedded or loaded in them identification numbers or strings that can be accessed by the processor 14, including the processor itself, which are utilized for authentication as explained below. In one embodiment, the components that are data files each use their file path and name as their identification number or string.

Either within the gaming machine 10, or in the diagnostic system 32 attachable to the gaming machine 10, are executable instructions or a software program 36 for authentication of the components (authentication software 36), which itself may be one of the components 12 to authenticate if it is internal to the gaming machine 10. In one embodiment, authentication software 36 is stored on a persistent storage media such as the hard disk device 16, ROM 20, EEPROM, in a complementary metal oxide semiconductor memory (CMOS) 38, in safe RAM comprising a battery-backed static random access memory (BBSRAM) 40, in flash memory components 42, 44, or other types of persistent memory. In one embodiment, the authentication software 36 is stored in a basic input/output system (BIOS) 22 device or chip. BIOS chips 22 have been used for storing prior authentication software, such as previous versions of the BIOS+ chip used by Bally Gaming Systems, Inc. of Las Vegas, Nev. in their EVO gaming system. Placing the authentication software 36 in the BIOS 22 is advantageous because the code in the BIOS 22 is usually the first code executed upon boot or start-up of the gaming machine 10, making it hard to bypass the authentication process. Alternatively, in one embodiment, the authentication software 36 is stored in a firmware hub (FWH), such as Intel's 82802 FWH.

As an alternative, instead of, or in conjunction with the hard disk device, another mass storage device is used, such as a CD-ROM, a CD-RW device, a WORM device, a floppy disk device, a removable type of hard disk device, a ZIP disk device, a JAZZ disk device, a DVD device, a removable flash memory device, or a hard card type of hard disk device.

It should be noted that the term, gaming device, is intended to encompass any type of gaming machine, including hand-held devices used as gaming machines such as cellular-based devices (e.g., phones), PDAs, or the like. The gaming device can be represented by any network node that can implement a game and is not limited to cabinet-based machines. The system has equal applicability to gaming machines implemented as part of video gaming consoles, handheld, or other portable devices. In one embodiment, a geo-location device in the handheld or portable gaming device may be used to locate a specific player for regulatory and other purposes. Geo-location techniques that can be used include by way of example, and not by way of limitation, an IP address lookup, a GPS, a cell phone tower location, a cell ID, a known Wireless Access Point location, Wi-Fi connection use, a phone number, a physical wire or a port on a client device, or by a middle tier or backend server access. In one embodiment, GPS and biometric devices are built within a player's client device, which in one embodiment, comprises a player's own personal computing device, or is provided by the casino as an add-on device using USB, Bluetooth, IRDA, serial or another interface to the hardware to enable jurisdictionally compliant gaming, ensuring the location of play and the identity of the player. In another embodiment, the casino provides an entire personal computing device with these devices built in, such as a tablet-type computing device, a PDA, a cell phone or other type of computing device capable of playing system games.

In one embodiment of the video extension system, several principles are used to guide the architectural design. The low-level system components are derived from third-party libraries (e.g., OpenGL). The high-level game engine insulates the programmer from complex details such as mathematics. The rendering module of the engine is an easily replaceable component. The shared libraries insulate the programmer from direct device interaction. The shared libraries support versioning with updates possible from either the game or OS flash. The shared libraries do not depend upon device-specific extensions since the video card may be replaced with a different model in the future. The shared libraries are designed with backwards compatibility with future revisions of Windows.

Figure 2:
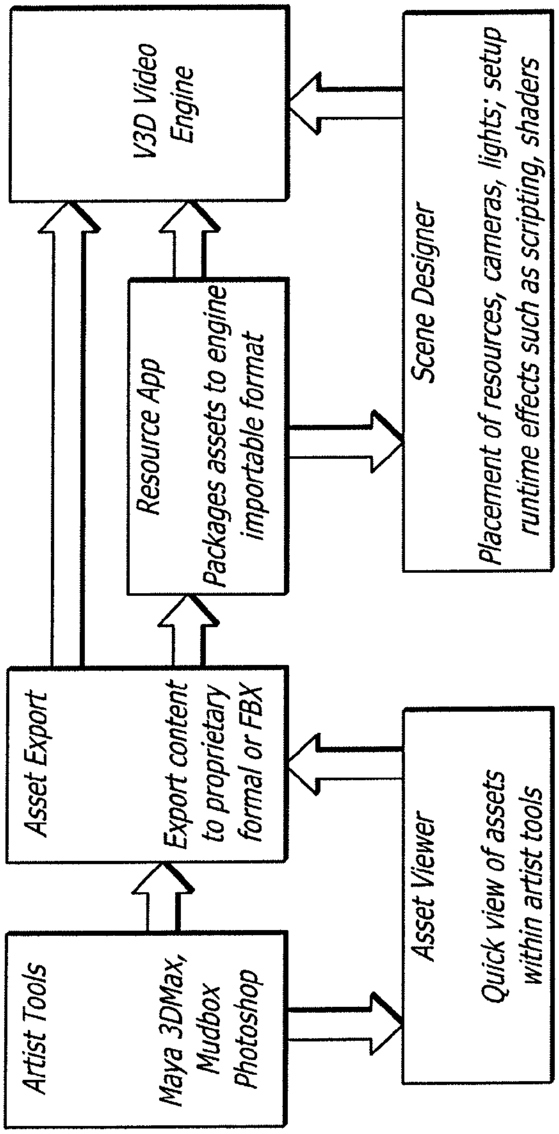
FIG. 2 illustrates tool chain paths.

Referring now to FIG. 2, in another aspect of one embodiment, a tool chain is configured with the following principles in mind. Tools are configured to integrate models with target run-time effects. In some embodiments, packaging for the target environment is required. In another aspect of the video extension system, existing, common applications and formats are preferred. Preferably, tools are optional and not required.

As shown in FIG. 2, in some embodiments of the video extension system, there are several paths for the tool chain. In this regard, while it is desirable to use a game designer application, this is not necessary for creating games. A game engine, constructed in accordance with the video extension system, is designed to accept input from either raw third party art tools, or from a provided game designer format. In one embodiment of the video extension system, a video extension library enables the game application to tie into a main render loop of an operating system video server. In this manner, the operating system video server has the opportunity to perform any final rendering that it deems appropriate.

Figure 3:
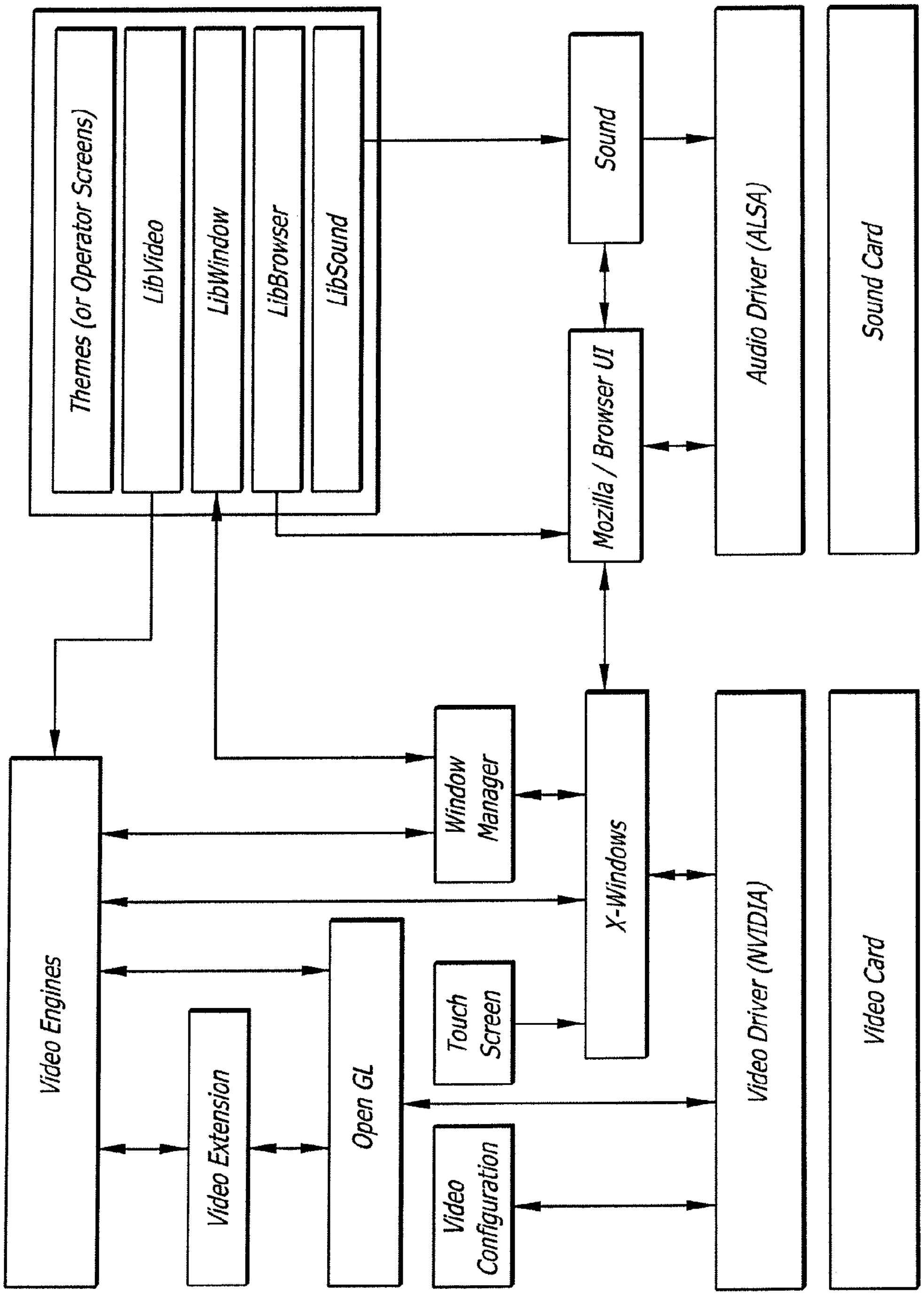
FIG. 3 illustrates high-level modules and interconnections.

Referring now to FIG. 3, a high-level diagram is provided that illustrates modules and their interconnections. In an embodiment of the video extension system, graphics are displayed by the game application and operating system which choose a video library from amongst available choices. Prior to the advent of the video extension system, there was only a single video library available for use by the game application and operating system. Typically, video libraries employ a window in which to display content. These windows are usually managed by a Window Manager Application that uses a layout as specified by a host system.

In one such embodiment, the windows are created by video engines using the Window Manager Libraries. Preferably, the operator menus and graphic interface components utilize the existing video library. In one embodiment, no major changes are made from an existing implementation. In another embodiment, the operating system utilizes Flash technology. In such an embodiment of the video extension system, Flash technology enables the operating system to have multiple options for use as a video library.

In another aspect of one embodiment, the video extension system includes a library that may be requested for loading by the game application. Preferably, the loading of library occurs after the Video::Init( ) is called, but before any Sprites or Image are created. A sprite is a graphic image that may move within a larger graphic image. In one embodiment, the operating system loads the most recent library it finds from among a set of library paths. In another embodiment, multiple video extensions may be loaded by a game Video Library Interface.

In another aspect of the video extension system, content is displayed by having the video server make calls to the video extension system before executing particular render iterations. In this regard, the video server initializes a particular iteration, and calls the video extension system to draw its content. The video server then displays its own content and completes the render iteration.

In still another aspect of the video extension system, the extension library receives an external communication, such as from the game application, by receiving extension messages that come to the video server. The video server in turn hands off the extension messages to the extension library for processing. Preferably, the extension library does not create IPC servers of its own. The receipt of extension messages is asynchronous, meaning they can occur at any time, independent of render loops.

In one embodiment of the video extension system, touch events go to X-Windows, which sends the events to a Window Manager, which in turn sends the events to the owner of the window, which is the video engine. The video engine can then send the touch events to the video extension. X-Windows is a computer software system and network protocol that provides a graphical user interface (GUI) for networked computers.

Preferably, the interface to the video services does not require significant changes to properly interact with the video extension system. In one embodiment, new interfaces and engines are added in association with support for three-dimension functionality. In one such embodiment, these engines are shared libraries that are updatable from the game application or OS flash. In another embodiment, no new engines are added. In varying embodiments, the video extension system may be packaged into a common package, in the OS library directory, or in the games library directory.

Figure 4:
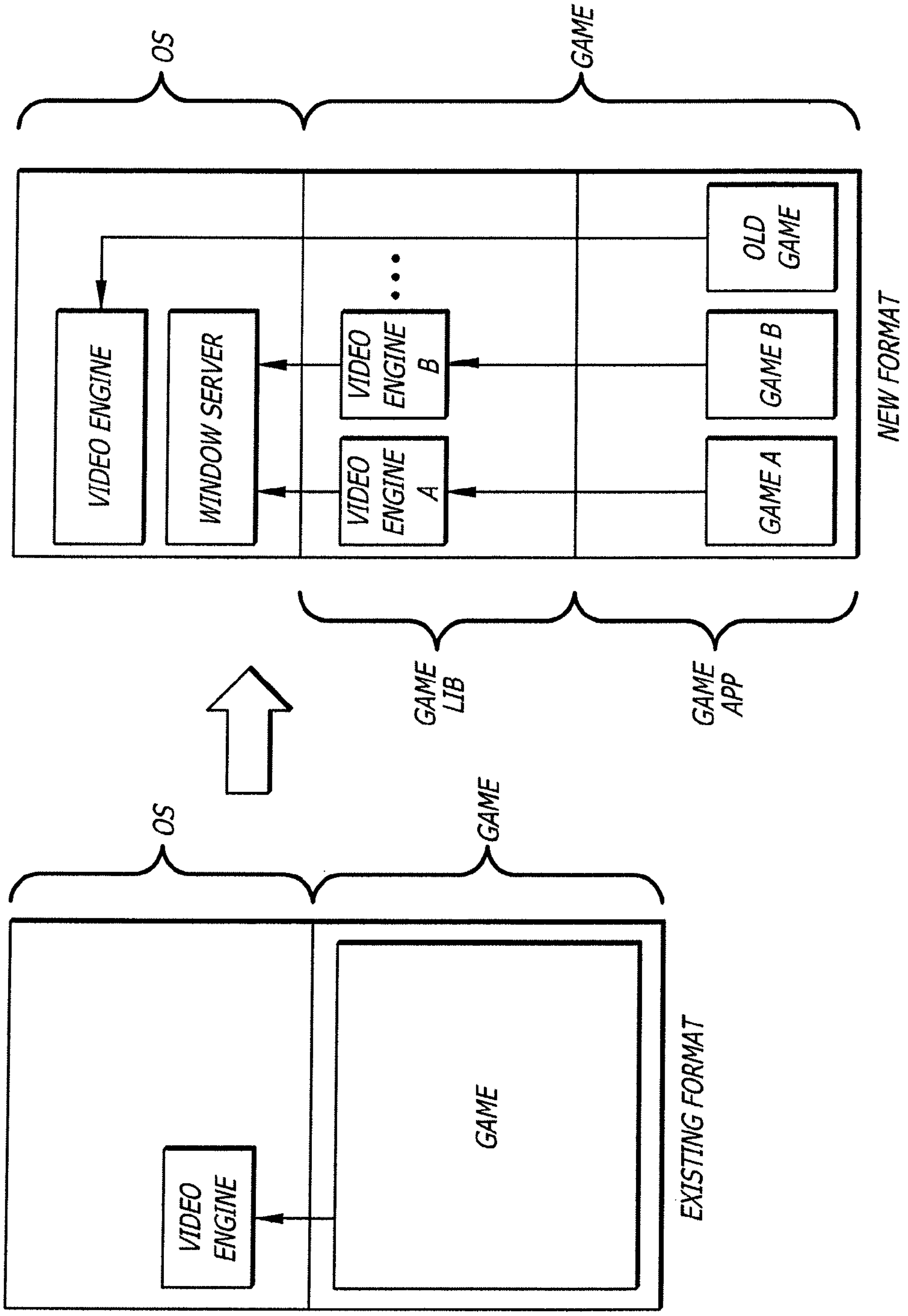
FIG. 4 illustrates an overview of existing and new formats.

Referring now to FIG. 4, another simplified high-level overview of the video extension system is shown. The system shown in FIG. 4 includes two compact flashes, one for the operating system and another for the game. Other components such as the BIOS and Jurisdiction are not included for simplicity. The video extension system has the game split into a game library (Game Lib) and the game application (game-app). In this regard, there are still video engines for the game library and game application. In the game library are video engines A, B, . . . , and N, as well as games A, B, . . . , and N. To show the connections, game A uses the video specific Game Lib which communicates with a more rudimentary video engine. Game B may have additional needs, such as 3-D requirements, and as such Game B requires a more powerful video engine. The video extension system breaks backward compatibility with Video A. Since this cannot be properly accommodated, it is necessary to create a Video B. In this manner, Video B may access the operating system video engines.

Figure 5:
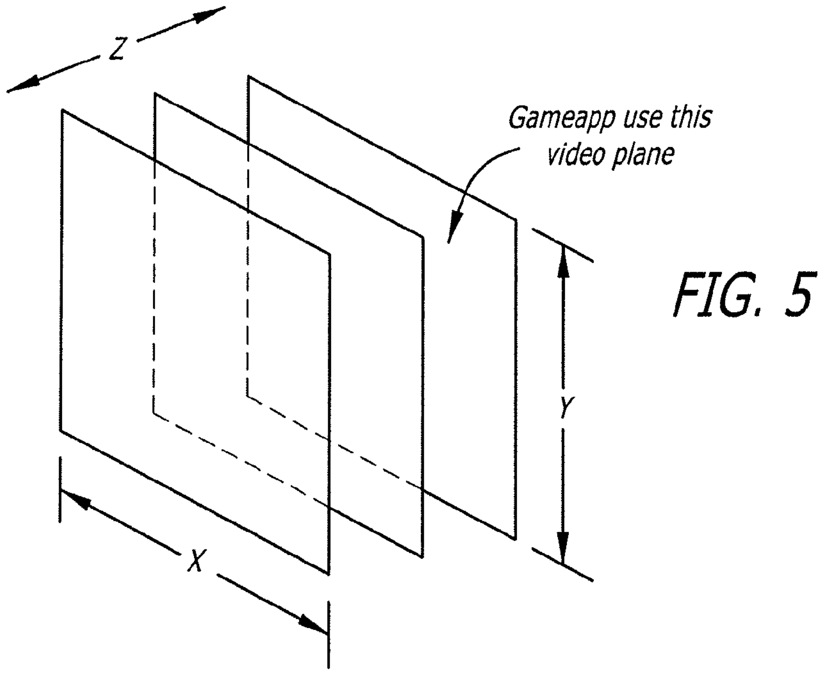
FIG. 5 illustrates a sample video plane layout.

In one embodiment of the video extension system, there is an existing "game window" handle for each game application. Through this operating system-provided "game window" handle, the game application (and its video requirements) is given access to the operating system. FIG. 5 shows a sample video plane layout in which a game application draws onto a video plane. The video plane count may be any number. In one embodiment, shown in FIG. 5, three planes are displayed. In this embodiment, the video planes resemble sheets of paper stacked on top of each other.

As described above, a game application employs a "game window" handle, which is provided by the operating system. Preferably, the operating system gives each game application a "game window" handle, and the hardware is utilized to display it. The Z-order (i.e., the depth) is the front to back order, with the Z-order panel for a game application window panel being at the rear. The video plane for the game application activity is preferably located in the rear, because it is desirable to have the ability to over-write the game screen to display higher-priority events, such as malfunctions or tilts. If the plane for displaying tilts was behind the game application window, then the tilts would not be seen since the game window would obstruct the "tilt window." Accordingly, in a preferred embodiment, the front video panel screens are used for operating system-related activities, with the middle screen for the operator screen menus to configure the operating system and the front screen for the tilt window.

In another aspect of the video extension system, a windows server (preferably a windows management Linux server) resides with the system's video engine in the operating system. The operating system contains the windows server to access these above video planes. Notably, when employing the video extension system, the game application only needs an operating system-provided "game window" handle to communicate with the video engine in the operating system. In this regard, the game application is merely given the electronic equivalent of a sheet of paper to perform its drawing functions. This is the only responsibility for the operating system with respect to the game application.

In a preferred embodiment of the video extension system, the operating system creates a dedicated window for the game application in the window server. Typically, there is also more than one window. For example, in a specific, non-limiting embodiment, such as the V20/20, there are two screens. In another specific, non-limiting embodiment, such as the Alpha 2 platform, support is provided for four physical displays. In this regard, the video extension system supports four (4) video windows to the game application (e.g., top, top middle, bottom middle, and bottom). The operating system provides these four windows to the game application to enable the game application to fill in the content of the displays.

Referring now to a legacy game, a legacy game does not require the advanced video engines that are part of a game application. Instead, such legacy games merely need to access a legacy video engine, as shown in the existing format of FIG. 1. This access is provided by the video extension system to enable a legacy game to continue to run. With an embodiment of the video extension system fully implemented, the legacy game may continue to connect to a video engine and not connect to the windows server. In this respect, the video extension system is backward-compatible with all legacy games.

Figure 6:
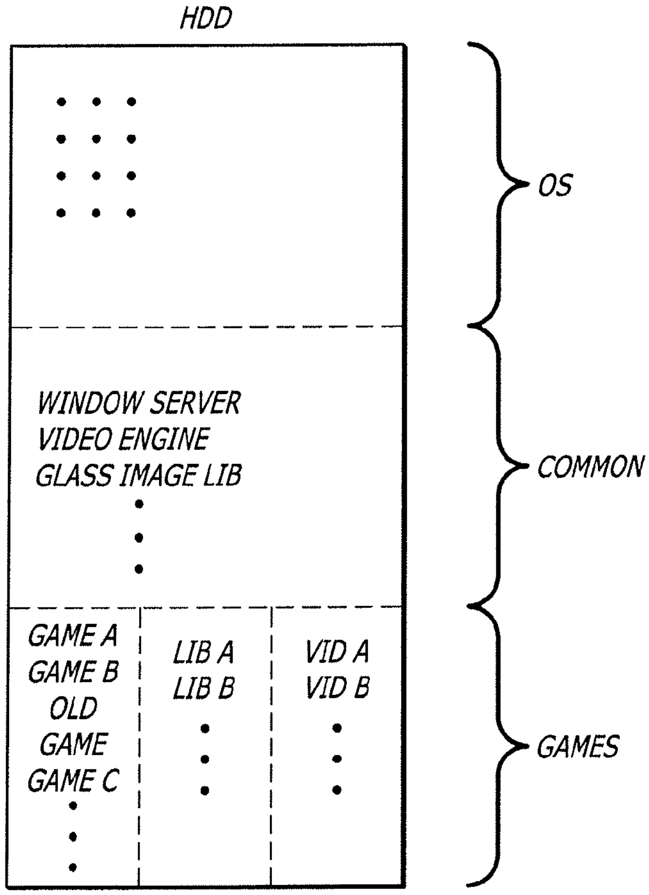
FIG. 6 illustrates a sample hard disk drive.

Referring now to FIG. 6, a Game Updateable Video Engine is shown that displays a sample hard disk drive (HDD) as another perspective of the previous OS/Game Lib/Game Application with video engines and windows servers. The hard disk drive is organized with the operating system, a Common area, and a Games area. In one embodiment, the hard disk drive is partitioned into Game A, Game B, legacy game, Library A, Library B, video A, video B, and the like.

Additionally, in some embodiments of the video extension system, modules may be added or deleted. In this regard, each game, library, and video listed here is a module that may be added into or deleted from the system. For example, in download technology, with Game A, Library A, and Video A downloaded, these three modules are all that is necessary to run Game A. If a legacy game gets downloaded, the game does not need any other dependent libraries or video engines. The legacy game stands on its own and is ready to run.

Referring now to a Video Server Interface, the following functions are added to the Video in the game API.

Loads an extension library. There can be multiple library loaded simultaneously.
@param baseName base name of the library
Video::LoadExtensionLibrary(const char *baseName)

Unloads an extension library.
@param baseName base name of the library
Video::UnloadExtensionLibrary(const char *baseName)

Sends an application message to the extension library.
@param data name of the sprite
@param size parent sprite
Video::SendExtensionMessage(void*data, int size)

Referring now to a Video Extension Interface, the following functions form the Video Extension interface. The screenNumber is associated with 0 for primary, 1 for secondary, and the like.

Called, once, to initialize the library.
@param is OpenGL if true, it indicates the server is running OpenGL calls.
@param numberOfScreens number of screens
void VideoExtension:Initialize(bool is OpenGL, int numberOfScreens)

Called before OpenGL screens are created. Returns TRUE if a Z-Buffer is required, a required z-buffer is always of 32 bit depth. The server is free to create a Z-Buffer even if this function returns FALSE but must create one if TRUE is returned. If a Z-Buffer is required the server must clear the Z-Buffer at each refresh when clearing the color buffer.
@param screenNumber screen number
bool VideoExtension::NeedsZBuffer(int ScreenNumber)

Called before OpenGL screens created. Returns TRUE if stencil buffer is required, a required stencil buffer is always an 8-bit depth. The server is free to create a stencil buffer even if this function returns FALSE but must create one if TRUE is returned. If a stencil buffer is required, the server must clear the stencil buffer at each refresh when clearing the color buffer.
@param screenNumber screen number
bool VideoExtension::NeedsStencilBuffer(int ScreenNumber)

Called by the video server to determine bits/pixel required by the extension.
@param screenNumber screen number
int VideoExtension::GetBitsPerPixelRequired(int screenNumber)

Called by video server to indicate to the extension of the screen & window resolution.
@param screenNumber if true, it indicates the server is running OpenGL calls.
@param horizontalResolution X resolution of the screen
@param verticalResolution Y resolution of the screen
@param windowHorizontalSize X resolution of the window
@param windowVerticalSize Y resolution of the window
@param rotated true indicates rotated display
void VideoExtension::ScreenInitialize(int screenNumber, int horizontalResolution, int verticalResolution, int windowHorizontalSize, int windowVerticalSize, bool rotated)

Called whenever a window is resized.

@param screenNumber if true, it indicates the server is running OpenGL calls.

@param newVerticalSize new window width

@param newHorizontalSize new window height void::WindowResize(int ScreenNumber, int NewVerticalSize, int newHorizontalSize)

Called right before any rendering updates take place.

@param screenNumber if true, it indicates the server is running OpenGL calls.

void VideoExtension::Prerender(int ScreenNumber)

Called when a touch event happens, and returns TRUE if a touch event is processed.

@param screenNumber if true, it indicates the server is running OpenGL calls.

@param newVerticalSize name of the sprite

@param newHorizontalSize name of the sprite bool VideoExtension::TouchEventDown(int screenNumber, int xPos, int yPosition)

bool VideoExtension::TouchEventUp(int screenNumber, int xPos, int yPosition)

bool VideoExtension::TouchEventDrag(int screenNumber, int xPos, int yPosition)

Called to deliver a message that it does not understand. The function returns TRUE if the message was processed or FALSE if the message was not understood.

@param data name of the sprite

@param size parent sprite bool Video::HandleMessage(void*data, int size)

Called before unloading the extension.

void VideoExtension::Shutdown(void)

Referring now to module management, in one embodiment of the video extension system, the operating system includes multiple components that are placed on a single hard disk drive, with some components being unrelated. The "Common" area holds material that is common and referenced by multiple games. By using the video extension system, the material in the "Common" area may have new versions downloaded as well. Thus, the material in the "Common" area includes the windows server, the video engines, and other components (e.g., a glass image library).

In accordance with another aspect of the video extension system, when these components are added or removed, whether by downloading or manual insertion of a compact flash, the system may be configured to check for new games and to transfer these games to the hard disk drive. This capability is also available to the operator via an administrative screen. For example, the operator can see that a Game A is not being used. The option is available to download to free space on the hard disk drive by the removal of the Game A, or the insertion of a new game following the Game A deletion. Notably, these modules are manageable, in that they are not fixed and not permanently located on the hard disk drive.

In one embodiment of the video extension system, the windows server has the ability to send a game and a video engine associated with that game, referred to herein as a "game window" handle. This "game window" handle may consist of a stream game handle from the window server. By implementing the "game window" handle, the game has now a window video plane to which the game may render and draw. In this manner, the game defines the content to be drawn.

Referring now to dependency checking, in order to determine the available games in one embodiment of the video extension system (or which libraries or video engines exist on the hard disk drive at any time), the registration of the modules helps define the hard disk drive contents. With an installation of any GAME/LIB/VID module(s), whether by download or a manual install, the module(s) are registered such that an active database lists the available games, as well as the game module's corresponding libraries and video engines.

The registering of the module data enables an operator to know if a game, for example Game B, exists on the hard disk drive, and thus, can be run. In one "Game B" related example, the system displays its list of Game B dependencies. The system registry then notifies that for Game B to run, Library A is required, as well as video engine B. A check of the database shows that the Library A and the video engine B exist on the hard disk drive. Game B is then available to be played. If the dependencies are missing, then Game B is not able to be run. As such, players are not allowed to select that game, since a component is missing that is required to run. In one embodiment, this functionality may be viewed through an administrative screen, including the addition of games, deletion of games, and dependency checking. Included within the dependency checking are categories of modules for the games, libraries, and video engines.

In yet another aspect of the video extension system, a game window may be passed off to a game-centric video engine. Since the video engine is not part of the operating system (as it was in the prior existing formats), but rather is a part of the game itself, this configuration enables the game to include which capabilities are desired, whether these functions are 3-D, 2-D, streaming video, cartoon graphics, or life realistic graphics.

In one embodiment of the video extension system, the extension system also includes a post render function enabling the game application to render its content after the normal sprites that are created through the video library. In another embodiment of the video extension system, the extension system has the ability to query the video server version. In another aspect of the video extension system, the game may add and remove the video engines while the operating system remains stable. In such an example, the operating system simply provides the game with a game window handle. By implementing the video extension system, these enhancements may now be performed at will by the game, without affecting the operating system. The operating system no longer needs to be modified and released.

Figure 7:
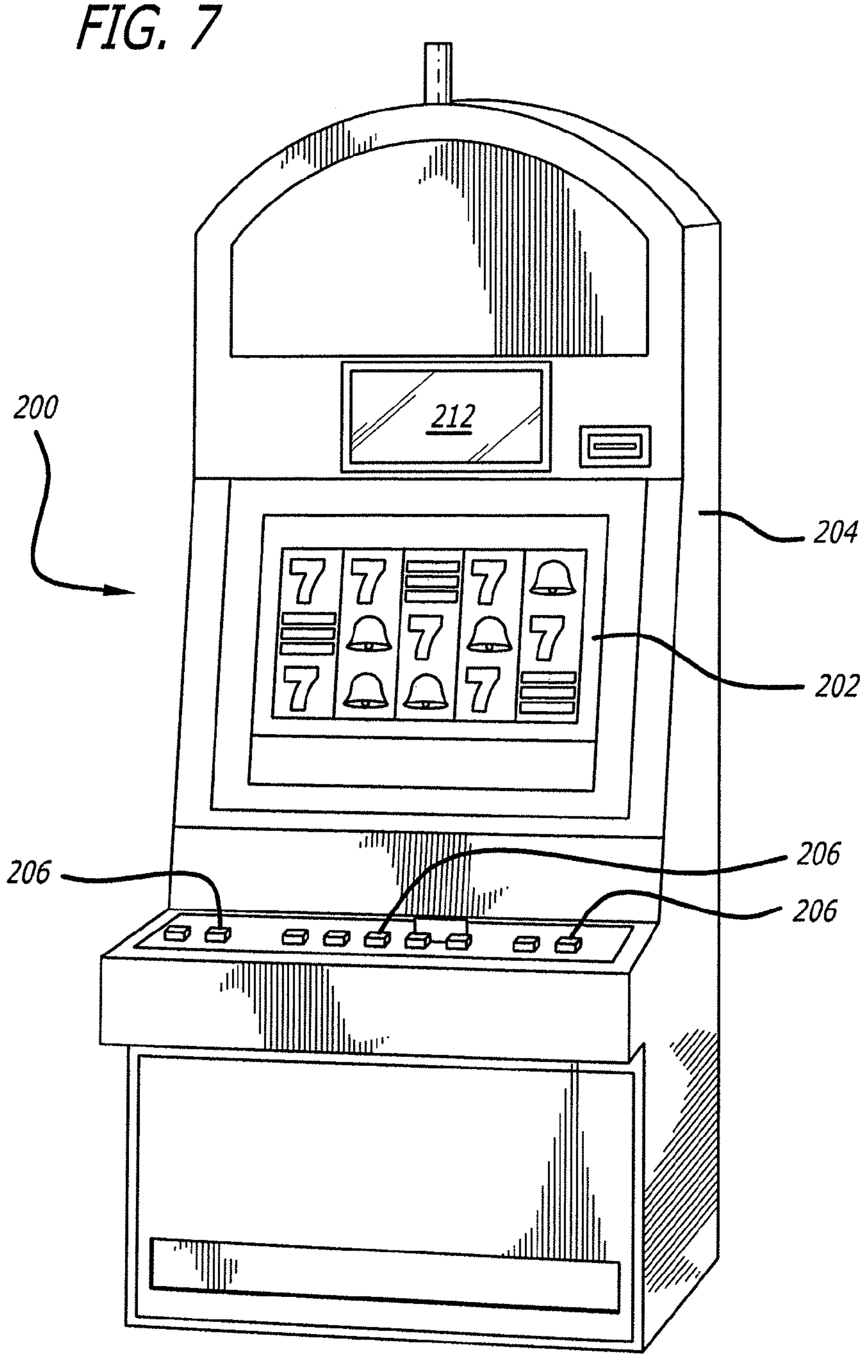
FIG. 7 illustrates one embodiment of a gaming device including the secured module for validating the BIOS.

FIG. 7 illustrates one embodiment of a gaming device including the secured module for validating the BIOS. Turning to FIG. 7, the main cabinet 204 of the gaming machine 200 is a self-standing unit that is generally rectangular in shape. In another embodiment, the main cabinet 204 may be a slant-top gaming cabinet. Alternatively, in other embodiments, the gaming cabinet may be any shaped cabinet known or developed in the art that may include a top box. Additionally, the cabinet may be manufactured with reinforced steel or other rigid materials that are resistant to tampering and vandalism. Optionally, in an alternate embodiment, the gaming machine 200 may instead be a cinema-style gaming machine (not shown) having a widescreen display, as disclosed in U.S. application Ser. No. 11/225,827, entitled "Ergonomic Gaming Cabinet," filed on Sep. 12, 2005, which is hereby incorporated by reference.

As shown in FIG. 7, the gaming machine 200 includes a main display 202. According to one embodiment, the main display 202 is a plurality of mechanical reels for presenting a slot-style game. Alternatively, the main display 202 is a video display for presenting one or more games such as, but not limited to, mechanical slots, video slots, video keno, video poker, video blackjack, video roulette, Class II bingo, games of skill, games of chance involving some player skill, or any combination thereof.

According to one embodiment, the main display 202 is a widescreen display (e.g., 16:9 or 16:10 aspect ratio display). In one embodiment, the display 202 is a flat panel display including by way of example only, and not by way of limitation, liquid crystal, plasma, electroluminescent, vacuum fluorescent, field emission, LCOS (liquid crystal on silicon), and SXRD (Silicon Xtal Reflective display), or any other type of panel display known or developed in the art. These flat panel displays may use panel technologies to provide digital quality images including by way of example only, and not by way of limitation, EDTV, HDTV, or DLP (Digital Light Processing).

According to one embodiment, the widescreen display 202 may be mounted in the gaming cabinet 204 in a portrait or landscape orientation. In another embodiment, the game display 202 may also include a touch screen or touch glass system (not shown). The touch screen system allows a player to input choices without using any electromechanical buttons 206. Alternatively, the touch screen system may be a supplement to the electromechanical buttons 206.

The main cabinet 204 of the gaming machine also houses a game management unit (not shown) that includes a CPU, circuitry, and software for receiving signals from the player-activated buttons 206 and a handle (not shown), operating the games, and transmitting signals to the respective game display 206 and speakers (not shown). Additionally, the gaming machine includes an operating system such as Bally Gaming's Alpha 05, as disclosed in U.S. Pat. No. 7,278,068, which is hereby incorporated by reference.

In various embodiments, a game program may be stored in a memory (not shown) comprising a read-only memory (ROM), volatile or non-volatile random access memory (RAM), a hard drive or flash memory device or any of several alternative types of single or multiple memory devices or structures.

As shown in FIG. 7, the gaming machine 200 includes a plurality of player-activated buttons 206. These buttons 206 may be used for various functions such as, but not limited to, selecting a wager denomination, selecting a number of games to be played, selecting the wager amount per game, initiating a game, or cashing out money from the gaming machine 200. The buttons 206 function as input mechanisms and may include mechanical buttons, electromechanical buttons or touch-screen buttons. In another embodiment, one input mechanism is a universal button module that provides a dynamic button system adaptable for use with various games, as disclosed in U.S. application Ser. No. 11/106,212, entitled "Universal Button Module," filed Apr. 14, 2005 and U.S. application Ser. No. 11/223,364, entitled "Universal Button Module," filed Sep. 9, 2005, which are both hereby incorporated by reference. Additionally, other input devices, such as but not limited to a touch pad, a track ball, a mouse, switches, and toggle switches are included with the gaming machine to also accept player input. Optionally, a handle (not shown) may be "pulled" by a player to initiate a slots-based game.

One of ordinary skill in the art will appreciate that not all gaming devices will have all these components or may have other components in addition to, or in lieu of, those components mentioned here. Furthermore, while these components are viewed and described separately, various components may be integrated into a single unit in some embodiments.

In some embodiments, the gaming machine 200 is part of a gaming system connected to or with other gaming machines as well as other components such as, but not limited to, a Systems Management Server (SMS) and a loyalty club system (e.g., casino management personnel/system (CMP/CMS)). Typically, the CMS/CMP system performs casino player tracking and collects regular casino floor and player activity data. The gaming system may communicate and/or transfer data between or from the gaming machines 200 and other components (e.g., servers, databases, verification/authentication systems, and/or third party systems).

Figure 8:
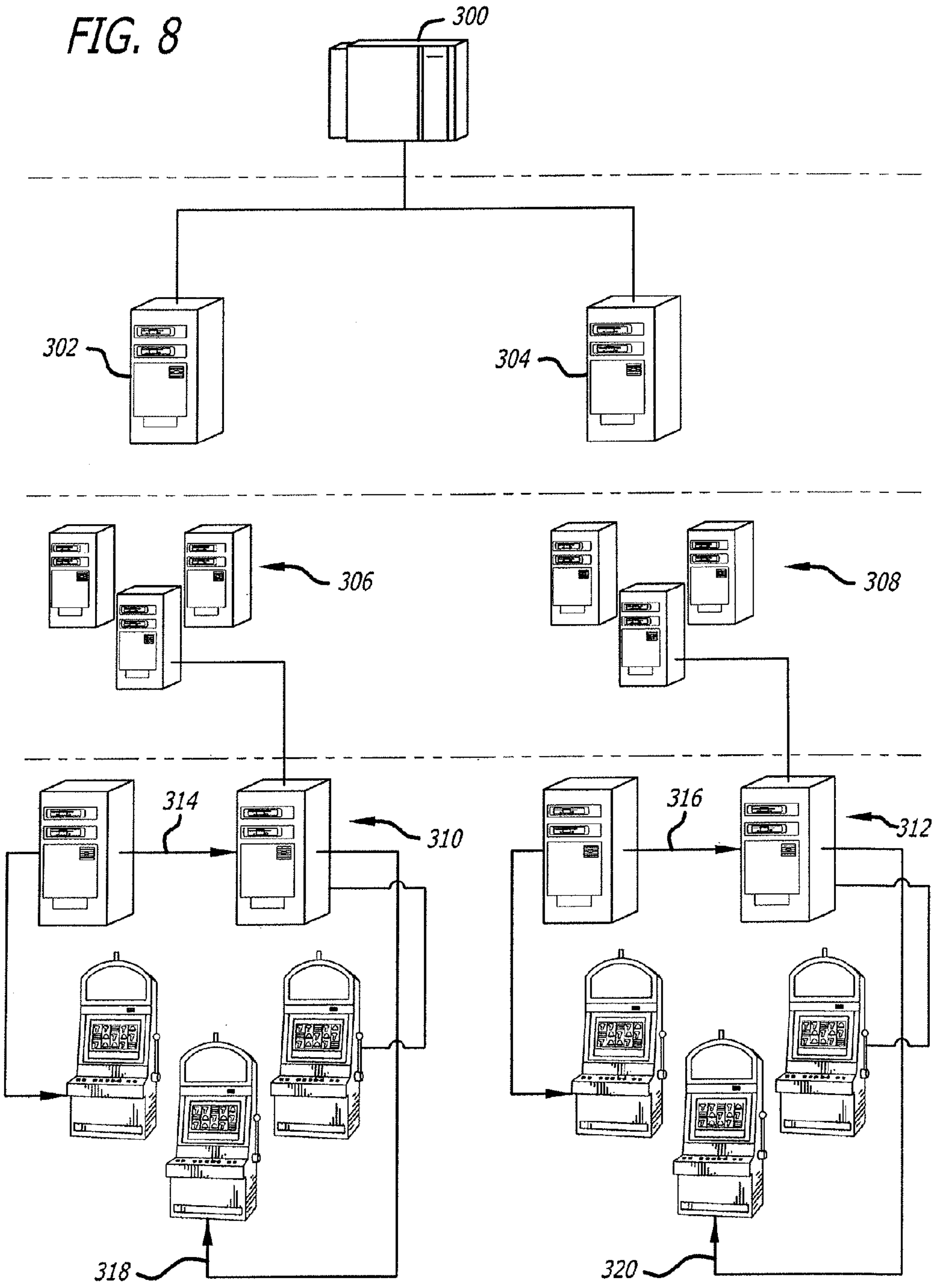
FIG. 8 illustrates one embodiment of a gaming system network including the gaming devices of FIG. 7.

An embodiment of a network that may be used with the system is illustrated in FIG. 8. The example network consists of a top-level vender distribution point 300 that contains all packages for all jurisdictions, one or more jurisdiction distribution points 302 and 304 that contain regulator-approved production signed packages used within that jurisdiction or sub-jurisdiction, one or more Software Management Points 306 and 308 to schedule and control the downloading of packages to the gaming machine, and one or more Software Distribution Points 310 and 312 that contain regulator-approved, production-signed packages only used in the gaming establishment that it supports. The Software Distribution Points (SDPs) 310 and 312 can communicate with Systems Management Points (SMPs) 314 and 316, respectively as well as directly to one or more gaming machines 318 and 320. The system allows for rapid and secure distribution of new games, configurations, and OS's from a centralized point. It makes it possible to update and modify existing gaming machines with fixes and updates to programs as well as providing modifications to such files as screen images, video, sound, pay tables and other gaming machine control and support files. It provides complete control of gaming machines from a centralized control and distribution point and can minimize the need and delay of human intervention at the gaming machine. In one embodiment, the configuration control may be from the SDPs 101 or 104 or from the gaming servers 103.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A gaming machine-enabled game system having a video extension system, the system comprising:

a physical network that connects and enables communication between components in the gaming machine-enabled gaming system;

a gaming server connected to the physical network, the gaming server including one or more processors and a game library, wherein the game library includes one or more library video engines; and a plurality of gaming machines, each gaming machine comprising:

at least one game display device;

a plurality of input devices including:

(a) player-activated buttons to enable selecting a wager amount; and (b) a cashout button actuatable to enable cashing out money from the gaming machine;

an output device for cashing out money from the gaming machine, and an operating system, wherein the operating system provides services to render graphics for the gaming machine, and wherein the operating system includes an OS video engine having a gaming machine memory and one or more gaming machine processors, the gaming machine memory storing one or more game applications that include a plurality of gaming machine instructions to enable receiving signals from the player-activated buttons, operating games, and transmitting signals to the at least one game display device;

wherein the game application includes one or more game modules, wherein each game module is associated with a corresponding library video engine in the gaming server-based game library or OS video engine in the gaming machine-based operating system; and wherein the system enables game modules within the gaming application that have new features which are not supported by the OS video engine of the gaming machine-based operating system to be instead supported by corresponding library video engines within the gaming server-based game library, wherein a game module having the new features accesses the library video engines of the gaming server and not the OS video engine, and a game module without the new features accesses the OS video engine.

2. The system of claim 1, wherein the system enables a shared library to be loaded from game flash, operating system flash, or a common package, and wherein the server checks to see which library is newer, and loads the shared library that the server determines is newest.

3. The system of claim 1, wherein the system further comprises gaming hardware, wherein the gaming hardware includes a video chipset for supporting game video on the gaming machine.

4. The system of claim 1, wherein the system further comprises a kernel, wherein the kernel includes a driver that manages low level details of the gaming machine.

5. The system of claim 1, wherein the video libraries use a shared library configuration that is common to both the game and the operating system.

6. The system of claim 1, wherein a memory and CPU utilization are improved by using polygon-based rendering.

7. The system of claim 1, wherein graphics are displayed by using the game application and operating system which choose a video library from among available choices, instead of having only a single video library available for use by the game application and operating system.

8. The system of claim 1, wherein windows are created by video engines using a window manager library.

9. The system of claim 1, wherein the video extension system includes a library that may be requested for loading by the game application, and wherein the loading of a library occurs after a video initiation command is called, but before any sprites or images are created, wherein a sprite is a graphic image that may move within a larger graphic image.

10. The system of claim 1, wherein the operating system loads the most recent library found from among a set of library paths.

11. The system of claim 1, wherein video content is displayed by having a video server make calls to the video extension system before executing particular render iterations, wherein the video server initializes a particular iteration, and calls the video extension system to draw its content, and wherein the video server then displays its own content, and completes the render iteration.

12. The system of claim 1, wherein the operating system provides each game application with a game window handle.

13. The system of claim 1, wherein a Z-order depth is measured from front to back, with a Z-order panel for a game application window panel being furthest to the rear.

14. The system of claim 1, wherein a video plane for the game application activity is located in the rear, thereby enabling higher priority events that include malfunctions and tilts, being able to over-write the game screen to display the higher priority events.

15. The system of claim 13, wherein a windows server resides with a video engine in the operating system, and wherein the windows server enables the operating system to access multiple video planes.

16. The system of claim 1, wherein the game application employs a game window handle to communicate with the video engine in the operating system.

17. The system of claim 1, wherein modules include at least game modules, library modules, and video modules, and wherein the modules are not fixed and not permanently located on a hard disk drive.

18. The system of claim 1, wherein the system further includes a post render component that enables a game application to render content after sprites that are created through a video library.

19. The system of claim 1, wherein the system enables querying of a video server version.

20. The system of claim 1, wherein the system enables a game to add and/or remove video engines while the operating system remains stable.

21. The system of claim 1, wherein the gaming machine is a hand-held, portable device.

22. The system of claim 1, wherein the gaming machine interfaces with a GPS add-on device using USB, Bluetooth, IRDA, serial, or other interface, thereby ensuring a location of play and an identity of the player.

23. The system of claim 1, wherein the gaming machine interfaces with a biometric device using USB, Bluetooth, IRDA, serial or another interface, thereby ensuring the location of play and the identity of the player.

24. A gaming machine-enabled video extension system, the system comprising:

a physical network that connects and enables communication between components in the gaming machine-enabled gaming system;

a gaming server connected to the physical network, the gaming server including one or more processors and a game library, wherein the game library includes one or more library video engines; and a plurality of gaming machines, each gaming machine comprising:

at least one game display device;

a plurality of input devices including:

(a) player-activated buttons to enable selecting a wager amount; and (b) a cashout button actuatable to enable cashing out money from the gaming machine;

an output device for cashing out money from the gaming machine, and an operating system, wherein the operating system provides services to render graphics for the gaming machine, and wherein the operating system includes an OS video engine having one or more gaming machine processors; and a gaming machine memory storage device for storing one or more game applications that include a plurality of gaming machine instructions to enable receiving signals from the player-activated buttons, operating games, and transmitting signals to the at least one game display device;

wherein the game application includes one or more game modules, wherein each game module is associated with and supported by a corresponding library video engine in the gaming server-based game library or OS video engine in the gaming machine-based operating system; and wherein the system enables game modules within the gaming application that have new features which are not supported by the OS video engine of the gaming machine-based operating system to be instead supported by corresponding library video engines within the gaming server-based game library;

wherein a game module having the new features accesses the library video engines of the gaming server and not the OS video engine, and a game module without the new features accesses the OS video engine.

25. The system of claim 24, wherein the hand-held, portable device is a cellular-based device, mobile phone, personal digital assistant, tablet-type computing device, or other personal computing device.

26. The system of claim 24, wherein the gaming machine includes a GPS device, thereby ensuring a location of play.

27. The system of claim 24, wherein the gaming machine includes a biometric device, thereby ensuring an identity of the player.

* * * * *